US012563021B2

(12) United States Patent
   Afshari et al.

(10) Patent No.: US 12,563,021 B2
(45) Date of Patent: Feb. 24, 2026

(54) SECURE COMMUNICATION PROTOCOL FOR COMMUNICATION DEVICES

(71) Applicant: Schneider Electric Industries SAS, Rueil Malmaison (FR)

(72) Inventors: William Afshari, Saint-Paul de Vence (FR); Zakarya Drias, Boston, MA (US)

(73) Assignee: Schneider Electric Industries SAS, Rueil-Malmaison (FR)

( * ) Notice: Subject to any disclaimer, the term of this patent is extended or adjusted under 35 U.S.C. 154(b) by 138 days.

(21) Appl. No.: 18/134,108

(22) Filed: Apr. 13, 2023

(65) Prior Publication Data

US 2023/0353545 A1      Nov. 2, 2023

(30) Foreign Application Priority Data

Apr. 27, 2022      (EP) ..................................... 22305626

(51) Int. Cl.
   *H04L 9/40*        (2022.01)
   *H04L 9/08*        (2006.01)
   *H04L 9/32*        (2006.01)

(52) U.S. Cl.
   CPC .......... *H04L 63/0435* (2013.01); *H04L 9/085* (2013.01); *H04L 9/321* (2013.01); *H04L 63/162* (2013.01); *H04L 63/20* (2013.01)

(58) Field of Classification Search
   CPC ..... H04L 63/0435; H04L 9/085; H04L 9/321; H04L 63/162; H04L 63/20; H04L 63/08;

(Continued)

(56) References Cited

U.S. PATENT DOCUMENTS

| | | | | |
|---|---|---|---|---|
| 5,802,178 A | * | 9/1998 | Holden | ................... G06F 21/57 |
| | | | | 713/151 |
| 6,253,321 B1 | * | 6/2001 | Nikander | ............ H04L 63/0236 |
| | | | | 713/168 |

(Continued)

FOREIGN PATENT DOCUMENTS

| | | | | | |
|---|---|---|---|---|---|
| EP | | 4020942 A1 | * | 6/2022 | ......... H04L 12/4641 |
| WO | WO-2020084151 A1 | * | 4/2020 | ......... H04L 63/0471 |

OTHER PUBLICATIONS

European Search Report and Search Opinion dated Oct. 7, 2022 for corresponding European Patent Application No. EP22305626.8, 8 pages.

*Primary Examiner* — John B King
(74) *Attorney, Agent, or Firm* — Wolf, Greenfield & Sacks, P.C.

(57)      ABSTRACT

A method for transmitting secured Ethernet frames on a communication line, the method including the following in a transmitter module: receiving an Ethernet frame comprising payload data from a network layer; retrieving a secure policy, defining the type of security to be applied to the Ethernet frame; producing an initialization vector based on an encryption counter and a physical address of the transmitter module; creating an authentication tag by applying an authentication algorithm on the secure policy, the initialization vector and the payload data using a shared key and the initialization vector; adding the secure policy, the initialization vector and the authentication tag to the payload data to create a secured Ethernet frame; and sending the secured Ethernet frame to a data link layer for transmission on the communication line.

20 Claims, 3 Drawing Sheets

(58) Field of Classification Search
CPC ....... H04L 9/3247; H04L 9/40; H04L 63/123;
H04L 63/164
See application file for complete search history.

(56) References Cited

U.S. PATENT DOCUMENTS

| 11,748,492 | B1 * | 9/2023 | Campagna ............ H04L 9/0637 |
|---|---|---|---|
| | | | 713/150 |
| 2002/0035635 | A1 * | 3/2002 | Holden ................ H04L 67/563 |
| | | | 726/1 |
| 2002/0154779 | A1 * | 10/2002 | Asano ................... H04L 9/0863 |
| 2002/0184487 | A1 * | 12/2002 | Badamo ............. H04L 63/0464 |
| | | | 713/153 |
| 2002/0188839 | A1 * | 12/2002 | Noehring ................ H04L 69/22 |
| | | | 713/153 |
| 2005/0198531 | A1 * | 9/2005 | Kaniz ................... H04L 63/164 |
| | | | 726/5 |
| 2008/0075073 | A1 | 3/2008 | Swartz |
| 2015/0010012 | A1 * | 1/2015 | Koponen ............... H04L 63/20 |
| | | | 370/411 |
| 2019/0268145 | A1 * | 8/2019 | Barth ................... H04L 9/0838 |
| 2020/0366715 | A1 | 11/2020 | Chopra et al. |
| 2021/0294889 | A1 | 9/2021 | Zeh et al. |
| 2022/0393856 | A1 * | 12/2022 | Goel .................... H04L 63/164 |

* cited by examiner

SECURE COMMUNICATION PROTOCOL FOR COMMUNICATION DEVICES

CROSS-REFERENCE TO RELATED APPLICATIONS

This patent claims priority under 35 U.S.C. § 119 to European Patent Application No. 22305626.8, filed on Apr. 27, 2022, and titled "SECURE COMMUNICATION PROTOCOL FOR COMMUNICATION DEVICES."

FIELD OF INVENTION

The present disclosure relates generally to networks, like industrial networks and, more particularly, to systems that support multiple industrial Ethernet protocols, fieldbus protocols and provide high performance for communication in industrial architecture.

BACKGROUND

Industrial automation/control systems are employed for controlling operation of a wide variety of systems, including processes, machines, etc., and are typically adaptable to different control applications through configuration and interconnection of multiple control system components or devices, such as control modules, Input/Output (I/O) modules, I/O devices, etc. Existing industrial control systems typically include a processor running or executing a control program to interact with an I/O system (e.g., typically one or more I/O modules or devices) to receive system information in the form of analog and/or digital inputs from field sensors and to provide outputs (analog and/or digital) to one or more actuators. Industrial control systems are increasingly being interconnected with management information and other systems in a manufacturing facility, and may be operatively connected to any number of communications networks to facilitate various business management functions such as inventory control, accounting, manufacturing control, etc., in addition to the process/machine control functionality.

A desire to integrate the business and control network structures to interconnect industrial control systems with general purpose systems, along with the evolution and development of fast Ethernet (e.g., in switch mode with full duplex capability), has allowed for Industrial Ethernet networks (e.g., such as Ethernet/IP networks that allow for direct connection of field devices to an Ethernet network) to be widely used in industrial applications. Indeed, industrial Ethernet is becoming the dominant (if not incumbent) technology in industrial automation.

In a slice I/O architecture, a standalone I/O island is connected to a control device like a programmable logic controller PLC with a fieldbus like Ethernet/IP and contains a head driving clusters of I/O modules respectively through cluster managers. A cluster is a set of I/O modules, up to 32 modules, physically linked together through a backplane and an I/O module is a usual automation module converting electrical signals to digital values. In a cluster, the cluster manager and different modules can communicate by means of their respective switches through a multipoint communication line.

Such systems present a controlled Ethernet network that can be subject to various type of cyber-attacks. Therefore, a proper cybersecurity architecture must be implemented to defeat any eventual IO-system tampering attempt. Indeed communications between devices must ensure data integrity (and confidentiality if required) since it is easy to plug malicious devices on the network. For example malicious devices can corrupt data in transit, steal sensitive data, act as normal devices while returning invalid data, or force other devices to think they are placed elsewhere.

It currently exists many protocols that allow devices to communicate securely (for example IPsec, MACsec. TLS, DTLS, OPC-UA Secure). However none of them meet all the requirements of embedded system communications, like lightness, fastness, compatibility with Time Sensitive Networking and compatibility with OPC-UA (Open Platform Communications United Architecture) in Client/Server configuration or in Pub/Sub configuration.

There is therefore a need for mitigating these issues.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for transmitting secured Ethernet frames on a communication line, said method comprising the following steps in a transmitter module:

receiving an Ethernet frame comprising payload data from a network layer, retrieving a secure policy, defining the type of security to be applied to the Ethernet frame, producing an initialization vector based on an encryption counter and a physical address of the transmitter module, creating an authentication tag by applying an authentication algorithm on the secure policy, the initialization vector and the payload data using a shared key and the initialization vector, adding the secure policy, the initialization vector and the authentication tag to the payload data to create a secured Ethernet frame, sending the secured Ethernet frame to a data link layer for transmission on the communication line.

Advantageously, the secured Ethernet frames present answers to the issue of securing the communications in a TSN (Time-Sensitive Network) embedded environment. Usually, communication security layers do not provide flexibility in dimensioning the security. In addition, the secured Ethernet frames are designed to protect the Ethernet layer and can be introduced in very low-cost systems and avoids the cost of specific Ethernet security modules.

The secured Ethernet frames can be integrated over the Ethernet driver layer, requiring a firmware object (no specific hardware required) that can be activated on-demand.

The overhead of security, linked to the secure policy, the initialization vector and the authentication tag can be flexible by choosing the overhead length. The authentication algorithm can rely on hardware crypto accelerator that are nowadays embedded in almost any new micro-controllers, which brings faster and more deterministic cryptography computation.

In an embodiment, the method further comprises encrypting the payload data by applying an encrypting algorithm on the payload data using a shared key and the initialization vector.

In an embodiment, the secure policy defines a policy for encryption and authentication or for authentication only.

In an embodiment, the size of the authentication tag is at least 8 bytes and the authentication tag is added into a first field following a second field containing the payload data.

In an embodiment, the shared key is a symmetric cryptographic key.

In an embodiment, the shared key is known from a receiver module to which the secured Ethernet frame is transmitted on the communication line.

In another implementation, there is provided a method for receiving secured Ethernet frames on a communication line, said method comprising the following steps in a receiver module:

receiving a secured Ethernet frame comprising payload data from a data link layer, retrieving a secure policy included in the secured Ethernet frame, defining the type of security applied to the secured Ethernet frame, retrieving an initialization vector included in the secured Ethernet frame, creating a verification authentication tag by applying an authentication algorithm on the secure policy, the initialization vector and the payload data using a shared key and the initialization vector, authenticating the secured Ethernet frame if the verification authentication tag matches an authentication tag included in the secured Ethernet frame, sending the secured Ethernet frame to a network layer for analyze of the content of the payload data of the secured Ethernet frame.

In an embodiment, the payload data are encrypted and the method further comprises decrypting the payload data by applying a decrypting algorithm on the payload data using a shared key and the initialization vector.

In an embodiment, the shared key is known from a transmitter module from which the secured Ethernet frame is received on the communication line.

In another implementation, there is provided a transmitter module for transmitting secured Ethernet frames on a communication line, said transmitter module comprising:

one or more network interfaces to communicate with receiver modules;

a processor coupled to the network interfaces and configured to execute one or more processes; and a memory configured to store a process executable by the processor, the process when executed operable to:

receive an Ethernet frame comprising payload data from a network layer, retrieve a secure policy, defining the type of security to be applied to the Ethernet frame, produce an initialization vector based on an encryption counter and a physical address of the transmitter module, create an authentication tag by applying an authentication algorithm on the secure policy, the initialization vector and the payload data using a shared key and the initialization vector, add the secure policy, the initialization vector and the authentication tag to the payload data to create a secured Ethernet frame send the secured Ethernet frame to a data link layer for transmission on the communication line.

In another implementation, there is provided a receiver module for receiving secured Ethernet frames on a communication line, said receiver module comprising:

one or more network interfaces to communicate with transmitter modules;

a processor coupled to the network interfaces and configured to execute one or more processes; and a memory configured to store a process executable by the processor, the process when executed operable to:

receive a secured Ethernet frame comprising payload data from a data link layer, retrieve a secure policy included in the secured Ethernet frame, defining the type of security applied to the secured Ethernet frame, retrieve an initialization vector included in the secured Ethernet frame, create a verification authentication tag by applying an authentication algorithm on the secure policy, the initialization vector and the payload data using a shared key and the initialization vector, authenticate the secured Ethernet frame if the verification authentication tag matches an authentication tag included in the secured Ethernet frame, send the secured Ethernet frame to a network layer for analyze of the content of the payload data of the secured Ethernet frame.

In another implementation there is provided a computer-readable medium having embodied thereon a computer program for executing a method for transmitting or receiving secured Ethernet frames on a communication line Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
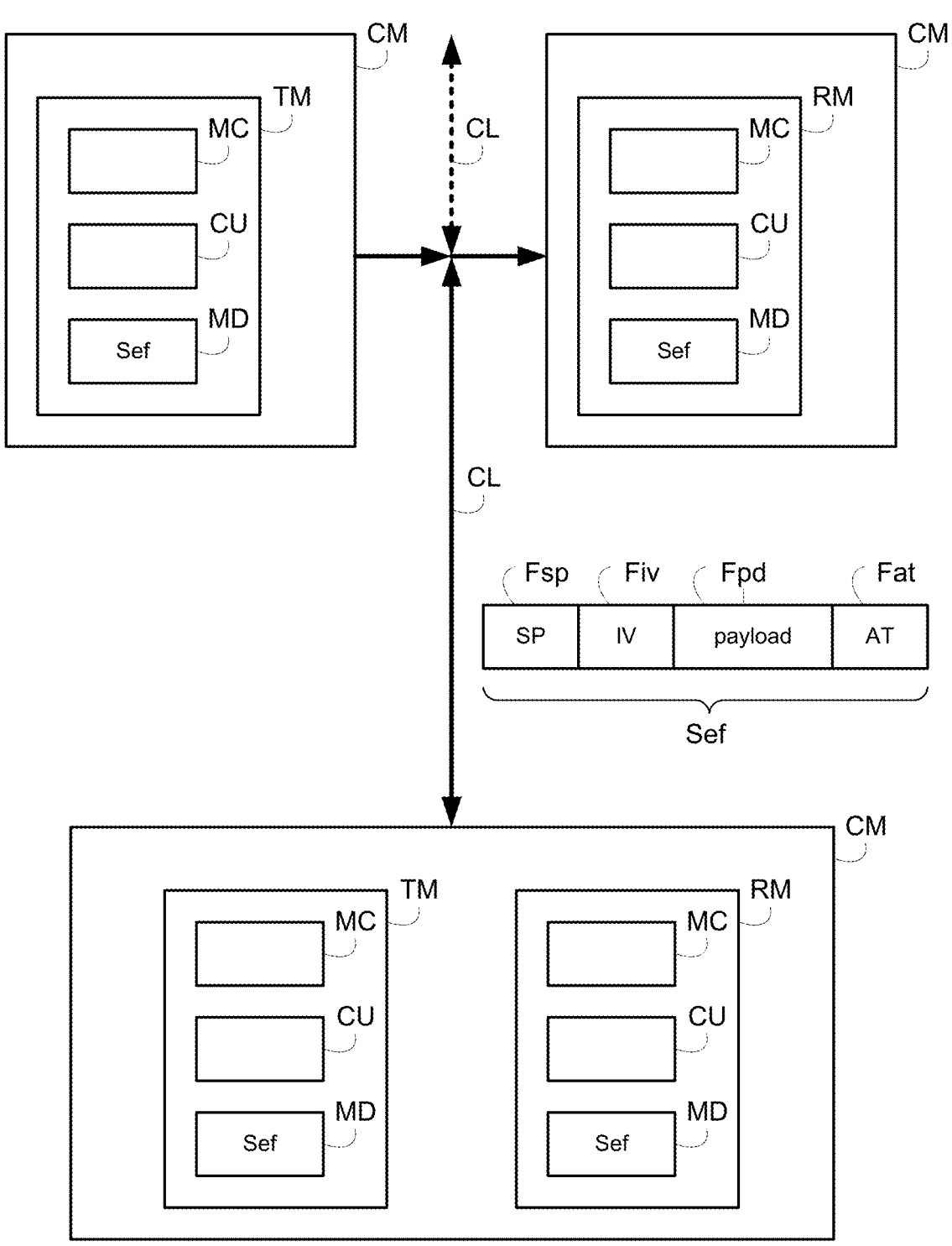
FIG. 1 shows a schematic block diagram of an industrial communication system using a secured communication protocol.

Referring to FIG. 1, a communication system comprises a plurality of communication devices CD able to communicate between them via a communication line CL. A communication device CD may comprise a transmitter module TM or a receiver module RM, or both a transmitter module TM and a receiver module RM.

In one embodiment, a communication devices CD can be a cluster manager (Head Unit or Extender) or an I/O module.

The cluster manager is able to manage communication with a set of I/O modules, up to 32, via the communication line, and optionally with another cluster manager via Ethernet and CAN (Controller Area Network) bus. The cluster manager is driven by a head that can drive other cluster managers. In one embodiment, the cluster manager is included in the head connected via a fieldbus to a control device like a PLC. In one embodiment, the head is also included in the PLC.

An I/O module can include Analog to Digital Converter (ADC) and Digital to Analog Converter (DAC) for connecting to sensors and the real world, communications modules, digital inputs and outputs, relays, and more. An I/O module communicates with the control manager through the communication line with adapted packet formats.

A transmitter module TM and a receiver module RM can be defined as Time Sensitive Networking (TSN) devices which allow a full duplex communication between the cluster manager and an I/O module without any collision in the data traffic. Furthermore, the switches are programmable with OPC-UA (Open Platform Communications United Architecture) frame summation acceleration. The OPC-UA is a data exchange standard for industrial communication and is a platform independent service-oriented architecture that integrates all the functionality of the individual OPC Classic specifications into one extensible framework. Generally, with the OPC-UA frame summation acceleration, a transmitter module is able to transmit an Ethernet frame containing data for all nodes (cluster manager or I/O modules) connected to the communication line CL. The Ethernet frame passes through all nodes in sequence and when it arrives at the last node on a trunk, the frame is turned back again. The nodes process the information in the frame as it passes through in one direction. Each node reads out data addressed to it on the fly, and inserts response data back into the frame.

The communication line CL is a physical medium configured to be coupled to multiple I/O modules and the cluster manager and may provide a multi-drop capability in one embodiment.

In one embodiment, the communication line CL connects the communication devices through base plates of the communication system. The base plates are respectively associated with the I/O modules that are plugged into them. The base plates may be designed to form a backplane for the set of I/O modules, each combination of base plate and associated I/O module forming a slice of the backplane.

In one embodiment, the communication line CL is an inter-cluster bus that links any Extender, in daisy chain, to the Head-Unit.

In one embodiment, the communication line CL is an intra-cluster bus that connects the I/O modules of a given cluster to the corresponding Extender.

A communication device CD is an electronic unit implementing a data link layer of the Open System Interconnection, OSI, model, and adapted for transmitting or receiving Ethernet frames on the communication line. Each of the transmitter module TM and the receiver module RM comprises a microcontroller MC, a cryptography unit CU and a MAC driver MD.

The microcontroller MC has a function of Packet-Processor, when implemented in a cluster manager CM for example. The cryptography unit CU implements a symmetrical encryption algorithm to allow both data encryption and authentication (called authenticated encryption).

The transmitter module TM of a communication device is able to build a secured Ethernet frame Sef by aggregating fields dedicated for a secure policy, an initialization vector, the payload data and an authentication tag. The secured Ethernet frame Sef to be transmitted can be received by the receiver module RM of another communication device able to process the aggregated fields.

Some information must be protected in confidentiality that is managed by a secure policy. The secure policy thus defines the type of security to be applied to the Ethernet frame. This information must be sent with the Ethernet frame in order to inform the receiver module RM about the current security policy. There may be different type of secure policies. The secure policy "encryption and authentication" brings confidentiality and integrity; and the secure policy "authentication only" allows data integrity only and the secure policy "non-secure" disables the bus security. To that end, the secured Ethernet frame includes a secure policy field Fsp that contains the secure policy SP and allows to indicate the nature of the secured Ethernet frame that is being receive The secure policy is predefined for a transmitter module, depending on the configuration of this latter. In one embodiment, the secure policy may be set according to rules of operation of the transmitter module and according to communication protocols to be used.

The secured Ethernet frame further includes an initialization vector field Fiv for informing the receiver module about an initialization vector IV that has been used to encrypt and/or authenticate an ingress Ethernet frame (this is required by the encryption engine).

An encryption counter is used to provide an initialization vector to the cryptography unit CU and can be incremented any times a secured Ethernet frame is sent (i.e. to avoid the use of the same counter's value for two different secured Ethernet frames). In one embodiment, the encryption counter is accompanied by the unique physical address of the transmitter module, which satisfies the uniqueness requirement of the initialization vector.

In one embodiment, initialization vector field Fiv contains 8 bytes, wherein 1 or 2 bytes are used for unique physical address of the transmitter module and 6 or 7 bytes are used for the encryption counter.

In one embodiment, the crypto unit CU implements an Advanced Encryption Standard with Galois Counter Mode (AES-GCM) engine, the AES-GCM being one of the few advanced symmetrical encryption algorithms to allow both data encryption and authentication (called authenticated encryption). It relies on two main block functions that are the AES-CTR (Counter Mode) chaining mode and the GHASH function. Indeed, the AES-CTR provides encryption and decryption and the GHASH brings authentication.

The cryptography unit CU processes the crypto function that requires symmetric cryptographic keys. Therefore, the cryptography unit CU is able to access memory big enough to store those keys.

The symmetric cryptographic keys are pre-shared keys used for encryption and authentication. In one embodiment, a common-to-all session key (called Group Key) is used as key management architecture, allowing the transmitter module TM and the receiver module RM to share keys.

To create a secured Ethernet frame Sef according to the secured communication protocol, the transmitter module TM is able to get a secure policy SP and to create a unique initialization vector IV.

The transmitter module TM is able to use a pre-shared key with the initialization vector to encrypt and/or authenticate the data. That encryption and/or authentication will generate an authentication tag AT. The secured Ethernet frame further includes an authentication tag field Fat for proving the authenticity and integrity of the secured Ethernet frame. In one embodiment, the authentication tag AT contains 8 bytes.

If the secure policy relates to encryption and authentication, the cryptography unit CU encrypts to the payload data by applying an encryption algorithm on the payload data using the shared key and the initialization vector. The cryptography unit CU further creates an authentication tag AT as a signature by applying an authentication algorithm on the secure policy, the initialization vector and the payload data using the shared key and the initialization vector.

If the secure policy relates to authentication only, the cryptography unit CU creates an authentication tag AT as a signature by applying an authentication algorithm on the secure policy, the initialization vector and the payload data using the shared key and the initialization vector.

The payload data, encrypted or not, are put in a payload data field Fpd before authentication tag field Fat.

The transmitter module TM is then able to create a secured Ethernet frame Sef by aggregating the fields dedicated for the secure policy, the initialization vector, the payload data and the authentication tag. The secured Ethernet frame can then be transmitted via the MAC driver MD. The aggregated the fields are seen as one payload field by the MAC driver.

In one embodiment, the MAC driver MD checks the nature of the Ethernet frame, i.e. if the secured communication protocol is enabled and if the Ethernet frame is either an IP one or an OPC-UA one for example. If the secured communication protocol is enabled, the MAC driver MD adds the related information in an Ethertype field of the secured Ethernet frame before transmitting the Ethernet frame.

In the reception path, the MAC driver of a receiver module checks the nature of the received Ethernet frame by analyzing the Ethertype field. If the Ethertype field indicates that the secured communication protocol is enabled, then the MAC driver MD calls the microcontroller MC to proceed to the security verification. If the secured communication protocol is not enabled, then the MAC driver MD processes a classic Ethernet frame reception.

To process a secured Ethernet frame Sef according to the secured communication protocol, the receiver module RM is able to retrieve the secure policy that will state the current secure policy. The secure policies can indicate a secured Ethernet frame or a non secured Ethernet frame. If it is a secured Ethernet frame, the secure policy is associated with no action. If it is secured Ethernet frame, the secure policy is associated with encryption and authentication, with authentication only (no encryption) or without encryption nor authentication.

The receiver module RM is able to analyze the initialization vector field that will inform about the initialization vector that has been used to encrypt and/or authenticate the secured Ethernet frame.

The receiver module RM is able to verify the authentication tag. If the authentication tag is correct, the receiver module RM can accept the secured Ethernet frame. If the authentication tag is false, the receiver module RM can discard the secured Ethernet frame.

In one embodiment, the communication devices CD are defined as Time Sensitive Networking (TSN) devices which allow a full duplex communication between communication devices without any collision in the data traffic.

In one embodiment, the communication devices are programmable with OPC-UA (Open Platform Communications United Architecture) frame summation acceleration. The OPC-UA is a data exchange standard for industrial communication and is a platform independent service-oriented architecture that integrates all the functionality of the individual OPC Classic specifications into one extensible framework. Generally, with the OPC-UA frame summation acceleration, a communication device is able to transmit an Ethernet frame containing data for all nodes (cluster manager or I/O modules) connected to the communication line CL. The Ethernet frame passes through all nodes in sequence and when it arrives at the last node on a trunk, the frame is turned back again. The nodes process the information in the frame as it passes through in one direction. Each node reads out data addressed to it on the fly, and inserts response data back into the frame.

An embodiment comprises a communication device CD under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

Figure 2:
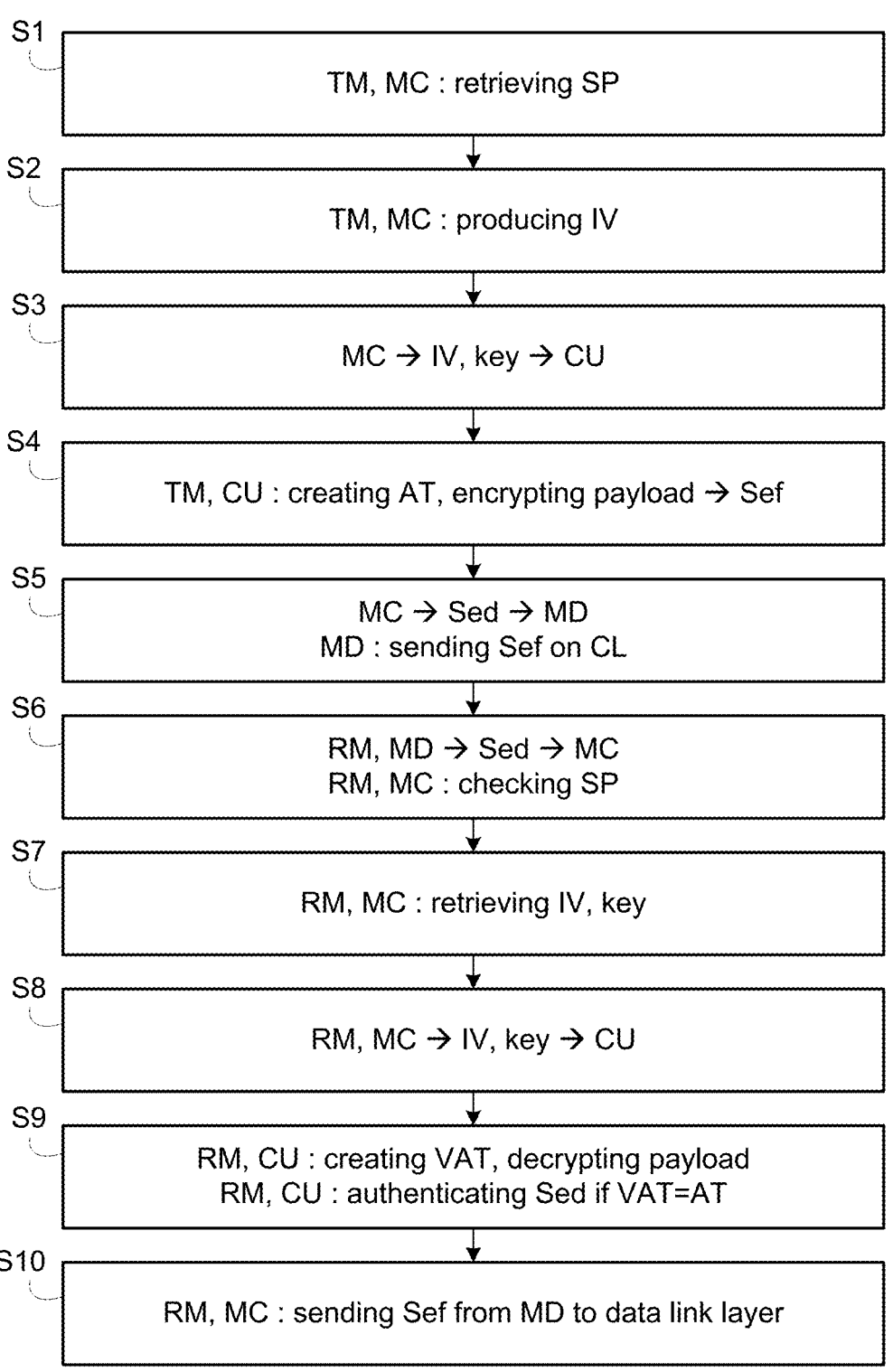
FIG. 2 shows a flow diagram of a method for a secured communication protocol according to one embodiment.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media With reference to FIG. 2, a method for a secured communication protocol for communication devices according to one embodiment of the invention comprises steps S1 to S10.

In step S1, the transmitter module TM is intended to transmit an Ethernet frame to a receiver module RM according to the secured communication protocol. The microcontroller MC receives an Ethernet frame comprising payload data from the network layer.

The microcontroller MC retrieves the secure policy SP predefined for the transmitter module TM.

If the secure policy indicates no encryption nor authentication, then the secured communication protocol is not enabled and the microcontroller MC lets the Ethernet frame to be pushed from the network layer to the data link layer and the method goes directly to step S5 for sending the Ethernet frame.

If the secure policy indicates encryption and authentication, or authentication only (no encryption), the method continues.

In step S2, the microcontroller MC retrieves the unique physical address of the transmitter module and the encryption counter to produce the initialization vector IV. Furthermore, the microcontroller MC retrieves the shared key as a session key.

In step S3, the microcontroller MC loads the initialization vector IV and the shared key in the cryptography unit CU.

In step S4, the microcontroller MC executes the policy indicated by the secure policy SP by submitting the payload data of the Ethernet frame to the cryptography unit CU.

If the secure policy indicates encryption and authentication, the cryptography unit CU encrypts to the payload data by applying an encryption algorithm on the payload data using the shared key and the initialization vector. The cryptography unit CU further creates an authentication tag AT as a signature by applying an authentication algorithm on the secure policy, the initialization vector and the payload data using the shared key and the initialization vector.

If the secure policy indicates authentication only, the cryptography unit CU creates an authentication tag AT as a signature by applying an authentication algorithm on the secure policy, the initialization vector and the payload data using the shared key and the initialization vector.

The Ethernet frame thus becomes a secured Ethernet frame Sed containing the secure policy SP, the initialization vector IV the payload data and the authentication tag AT, wherein the payload is encrypted or not according to the secure policy.

In step S5, the microcontroller MC sends the secured Ethernet frame to the MAC driver MD that is then able to transmit the secured Ethernet frame on the communication line CL towards another communication device.

From step S1 to step S5, the Ethernet frame in the network layer presenting a payload field containing payload data becomes the secured Ethernet frame in the data link layer presenting a payload field containing the payload data (eventually encrypted) aggregated with the secure policy, the initialization vector and the authentication tag In step S6, the receiver module RM of said another communication device receives through the MAC driver MD in the data link layer the secured Ethernet frame Sed transmitted from the transmitter module TM. The MAC driver MD sends the secured Ethernet frame Sed to the microcontroller MC that checks the secure policy SP included in the secure policy field of the secured Ethernet frame.

If the secure policy indicates no encryption nor authentication, then the secured communication protocol is not enabled and the microcontroller MC lets the Ethernet frame to be pushed from the data link layer to the network layer and the method goes directly to step S10.

If the secure policy indicates encryption and authentication, or authentication only (no encryption), the method continues.

In step S7, the microcontroller MC retrieves the initialization vector IV and the shared key as a session key.

In step S8, the microcontroller MC loads the initialization vector IV and the shared key in the cryptography unit CU.

In step S9, the microcontroller MC executes the policy indicated by the secure policy SP by submitting the payload data of the secured Ethernet frame to the cryptography unit CU.

If the secure policy indicates encryption and authentication, the cryptography unit CU decrypts to the payload data by applying a decryption algorithm on the payload data using the shared key and the initialization vector.

The cryptography unit CU creates a verification authentication tag VAT as a signature by applying an authentication algorithm on the secure policy, the initialization vector and the decrypted payload data using the shared key and the initialization vector.

If the secure policy indicates authentication only, the cryptography unit CU creates a verification authentication tag VAT as a signature by applying an authentication algorithm on the secure policy, the initialization vector and the payload data using the shared key and the initialization vector.

If the verification authentication tag VAT matches the authentication tag AT, the cryptography unit CU authenticates the secured Ethernet frame.

In step S10, the microcontroller MC instructs the MAC driver to push the secured Ethernet frame to the network layer that is then able to analyze the content of the payload of the secured Ethernet frame.

Advantageously, when the transmitter module TM and the receiver module RM are defined as Time Sensitive Networking (TSN) devices, the secured Ethernet frame is not altering any fields that are mandatory for the Ethernet network to be TSN compliant, and TSN fields can be in plain text. The format of the secured Ethernet frame is limiting the security overhead on the communications, adding 17 bytes of overhead for security in one embodiment (with the secure policy, the initialization vector and the authentication tag).

Figure 3A:
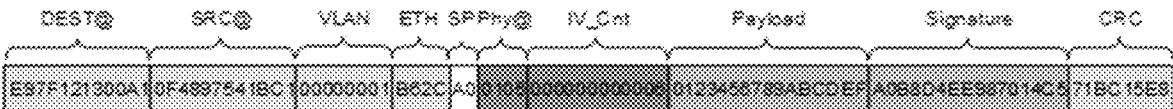
FIG. 3A shows a first example of a secured Ethernet frame, in "authentication only" mode.

FIG. 3A shows an example of a secured Ethernet frame in "authentication only" mode received by a receiver module.

The fields "DEST@", "SRC@", "VLAN", "ETH", and "CRC" are managed by the MAC driver. The secured Ethernet frame further contains fields "SP", "Phy@", "IV_Cnt", "Payload" and "Signature" corresponding to the aggregated fields forming a secured payload field.

For SP=A0="10100000", it indicates the secured Ethernet frame in "authentication only" mode.

For IV_Cnt="0105000000000006", it provides the unique initialization vector IV for an AES-GCM core of the cryptography unit CU.

For Payload="0123456789ABCDEF", it corresponds to a plaintext payload.

For Signature="A0B8D4EE987014C5", it provides the authentication tag as signature to be checked.

The fields "SP", "Phy@", "IV_Cnt", "Payload" are processed by the receiver module that returns a Verification-Signature (as verification authentication tag). If the Verification-Signature equals the Signature, the received secured Ethernet frame is considered as genuine. If no, the secured Ethernet frame is discarded.

Figure 3B:
FIG. 3B shows a second example of a secured Ethernet frame, in "encryption and authentication" mode.

FIG. 3B shows an example of a secured Ethernet frame in "encryption and authentication" mode received by a receiver module.

Also, the fields "DEST@", "SRC@", "VLAN", "ETH", and "CRC" are managed by the MAC driver. The secured Ethernet frame further contains fields "SP", "Phy@", "IV_Cnt", "Payload" and "Signature" corresponding to the aggregated fields forming a secured payload field.

For SP=E0="11100000", it indicates the secured Ethernet frame in "encryption and authentication" mode.

For IV_Cnt="0105000000000006", it provides the unique initialization vector IV for an AES-GCM core of the cryptography unit CU.

For Payload="F1C38AE4D4C81EF1", it corresponds to an encrypted payload.

For Signature="A0B8D4EE987014C5", it provides the authentication tag as signature to be checked.

The fields "SP", "Phy@", "IV_Cnt", "Payload" are processed by the receiver module that returns a decrypted frame (only the encrypted payload is decrypted) and a Verification-Signature (as verification authentication tag). If the Verification-Signature equals the ingress Signature, the received secured Ethernet frame is considered as genuine. If no, the secured Ethernet frame is discarded.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. A method for transmitting secured Ethernet frames on at least one communication line, said method comprising performing in a transmitter module:

receiving an Ethernet frame comprising payload data from a network layer, retrieving a secure policy, the secure policy defining a type of security to be applied to the Ethernet frame, wherein the secure policy specifies whether encryption and authentication, authentication only, or neither encryption nor authentication is to be applied, determining, from the secure policy, the type of security to be applied to the Ethernet frame, contingent upon a determination that the type of security to be applied is authentication or encryption, producing an initialization vector based on both an encryption counter and a physical address of the transmitter module, contingent upon a determination that the type of security to be applied is authentication, creating an authentication tag by applying an authentication algorithm on the secure policy, the initialization vector and the payload data using a shared key and the initialization vector, adding the secure policy, the initialization vector, if any, and the authentication tag, if any, to the payload data to create a secured Ethernet frame, and sending the secured Ethernet frame to a data link layer for transmission on the at least one communication line.

2. The method according to claim 1, wherein the Ethernet frame was provided using an industrial Ethernet protocol, and further comprising:

encrypting the payload data by applying an encrypting algorithm on the payload data using the shared key and the initialization vector.

3. The method according to claim 1, wherein a size of the authentication tag is at least 8 bytes and the authentication tag is added into a first field following a second field containing the payload data.

4. The method according to claim 1, wherein the shared key is a symmetric cryptographic key.

5. The method according to claim 1, wherein the shared key is known from a receiver module to which the secured Ethernet frame is transmitted on the at least one communication line.

6. A method for receiving secured Ethernet frames on at least one communication line, said method comprising performing in a receiver module:

receiving a secured Ethernet frame comprising payload data from a data link layer on the at least one communication line, retrieving a secure policy included in the secured Ethernet frame, the secure policy specifying a type of security to be applied to the secured Ethernet frame, wherein the secure policy specifies whether encryption and authentication, authentication only, or neither encryption nor authentication are applied, determining, from the secure policy, the type of security to be applied to the secured Ethernet frame, contingent upon a determination that the type of security to be applied is authentication or encryption, retrieving an initialization vector included in the secured Ethernet frame, contingent upon a determination that the type of security to be applied is authentication:

creating a verification authentication tag by applying an authentication algorithm on the secure policy, the initialization vector and the payload data using a shared key and the initialization vector, and authenticating the secured Ethernet frame if the verification authentication tag matches an authentication tag included in the secured Ethernet frame, and sending the secured Ethernet frame to a network layer for analysis of content of the payload data of the secured Ethernet frame.

7. The method according to claim 6, wherein the secured Ethernet frame is based on an Ethernet frame transmitted using an industrial Ethernet protocol and the payload data are encrypted and further comprising:

decrypting the payload data by applying a decrypting algorithm on the payload data using the shared key and the initialization vector.

8. The method according to claim 6, wherein the shared key is known from a transmitter module from which the secured Ethernet frame is received on the at least one communication line.

9. A transmitter module for transmitting secured Ethernet frames on at least one communication line, said transmitter module comprising:

one or more network interfaces to communicate with receiver modules;

a processor coupled to the one or more network interfaces and configured to execute one or more processes; and a memory configured to store a process executable by the processor, the process when executed operable to:

receive an Ethernet frame comprising payload data from a network layer, retrieve a secure policy, the secure policy defining a type of security to be applied to the Ethernet frame, wherein the secure policy specifies whether encryption and authentication, authentication only, or neither encryption nor authentication is to be applied, determine, from the secure policy, the type of security to be applied to the Ethernet frame, contingent upon a determination that the type of security to be applied is authentication or encryption, produce an initialization vector based on both an encryption counter and a physical address of the transmitter module, contingent upon a determination that the type of security to be applied is authentication, create an authentication tag by applying an authentication algorithm on the secure policy, the initialization vector and the payload data using a shared key and the initialization vector, add the secure policy, the initialization vector, if any, and the authentication tag, if any, to the payload data to create a secured Ethernet frame, and send the secured Ethernet frame to a data link layer for transmission on the at least one communication line.

10. A receiver module for receiving secured Ethernet frames on at least one communication line, said receiver module comprising:

one or more network interfaces to communicate with transmitter modules;

a processor coupled to the one or more network interfaces and configured to execute one or more processes; and a memory configured to store a process executable by the processor, the process when executed operable to:

receive a secured Ethernet frame comprising payload data from a data link layer on the at least one communication line, retrieve a secure policy included in the secured Ethernet frame, the secure policy specifying a type of security to be applied to the secured Ethernet frame, wherein the secure policy specifies whether encryption and authentication, authentication only, or neither encryption nor authentication are applied, determine, from the secure policy, the type of security to be applied to the secured Ethernet frame, contingent upon a determination that the type of security to be applied is authentication or encryption, retrieve an initialization vector included in the secured Ethernet frame, contingent upon a determination that the type of security to be applied is authentication:

create a verification authentication tag by applying an authentication algorithm on the secure policy, the initialization vector and the payload data using a shared key and the initialization vector, and authenticate the secured Ethernet frame if the verification authentication tag matches an authentication tag included in the secured Ethernet frame, and send the secured Ethernet frame to a network layer for analysis of content of the payload data of the secured Ethernet frame.

11. A non-transitory computer readable storage medium, with a computer program stored thereon, said computer program comprising instructions for, when executed by a processor, carrying out the method according to claim 1.

12. A non-transitory computer readable storage medium, with a computer program stored thereon, said computer program comprising instructions for, when executed by a processor, carrying out the method according to claim 6.

13. The method according to claim 1, wherein the initialization vector contains 8 bytes, wherein 1 or 2 bytes of the 8 bytes are used for the physical address of the transmitter module and 6 or 7 bytes of the 8 bytes are used for the encryption counter.

14. The method according to claim 1, wherein the Ethernet frame is received via the at least one communication line.

15. The method according to claim 6, wherein the secured Ethernet frame was transmitted via the at least one communication line.

16. The transmitter module according to claim 9, wherein at least one module of a group of modules comprising the transmitter module and the receiver modules is an input/output (I/O) module or is a cluster manager that is configured to manage communication with a set of input/output (I/O) modules.

17. The receiver module according to claim 10, wherein at least one module of a group of modules comprising the receiver module and the transmitter modules is an input/output (I/O) module or is a cluster manager that is configured to manage communication with a set of input/output (I/O) modules.

18. The transmitter module according to claim 16, wherein the set of I/O modules is configured for connecting to at least one of the group comprising a sensor, a communications module, actuator, and a relay.

19. The receiver module according to claim 17, wherein the set of input output (I/O) modules is configured for connecting to at least one of the group comprising a sensor, a communications module, actuator, and a relay.

20. The transmitter module according to claim 9, wherein the transmitter module is included in a communication device that further includes a receiver module of the receiver modules, and the communication device is configured to transmit the secured Ethernet frame to another communication device.

* * * * *